(12) United States Patent
Bendel et al.

(10) Patent No.: US 8,370,326 B2
(45) Date of Patent: Feb. 5, 2013

(54) SYSTEM AND METHOD FOR PARALLEL COMPUTATION OF FREQUENCY HISTOGRAMS ON JOINED TABLES

(75) Inventors: Peter Bendel, Holzgerlingen (DE); Oliver Draese, Holzgerlingen (DE); Vijayshankar Raman, Sunnyvale, CA (US); Knut Stolze, Jena (DE)

(73) Assignee: International Business Machines Corporation, Armonk, NY (US)

( * ) Notice: Subject to any disclaimer, the term of this patent is extended or adjusted under 35 U.S.C. 154(b) by 384 days.

(21) Appl. No.: 12/409,713

(22) Filed: Mar. 24, 2009

(65) Prior Publication Data
US 2010/0250517 A1    Sep. 30, 2010

(51) Int. Cl.
*G06F 17/30* (2006.01)
(52) U.S. Cl. ........................................................ 707/714
(58) Field of Classification Search .................... 707/714
See application file for complete search history.

(56) References Cited

U.S. PATENT DOCUMENTS

| | | | |
|---|---|---|---|
| 4,769,772 A | 9/1988 | Dwyer | |
| 6,012,062 A | 1/2000 | Jagadish et al. | |
| 6,018,738 A | 1/2000 | Breese et al. | |
| 6,049,630 A | 4/2000 | Wang et al. | |
| 6,161,105 A | 12/2000 | Keighan et al. | |
| 6,289,339 B1 | 9/2001 | Weber | |
| 6,309,424 B1 | 10/2001 | Fallon | |
| 6,330,555 B1 | 12/2001 | Weber | |
| 6,397,204 B1* | 5/2002 | Liu et al. ............................ | 1/1 |
| 6,405,198 B1 | 6/2002 | Bitar et al. | |
| 6,661,839 B1 | 12/2003 | Ishida et al. | |
| 7,111,094 B1 | 9/2006 | Liu et al. | |
| 7,239,754 B2 | 7/2007 | Akimoto et al. | |
| 7,251,648 B2 | 7/2007 | Chaudhuri et al. | |
| 7,339,501 B2 | 3/2008 | Ban et al. | |
| 7,466,742 B1 | 12/2008 | Srinivasan | |
| 7,711,736 B2 | 5/2010 | Levin | |
| 7,739,275 B2 | 6/2010 | Dubinko et al. | |
| 7,827,187 B2 | 11/2010 | Raman et al. | |
| 7,860,865 B2 | 12/2010 | Uppala | |
| 2004/0010488 A1* | 1/2004 | Chaudhuri et al. ................ | 707/3 |
| 2004/0193629 A1* | 9/2004 | Mozes .......................... | 707/100 |
| 2005/0055367 A1 | 3/2005 | Vo et al. | |
| 2005/0192994 A1 | 9/2005 | Caldwell et al. | |
| 2006/0190497 A1 | 8/2006 | Inturi et al. | |
| 2006/0233257 A1 | 10/2006 | Keith et al. | |
| 2006/0251330 A1 | 11/2006 | Toth et al. | |
| 2007/0143369 A1 | 6/2007 | Uppala | |
| 2008/0059540 A1* | 3/2008 | Brown et al. .................. | 707/204 |
| 2008/0294676 A1 | 11/2008 | Faerber et al. | |
| 2008/0294863 A1 | 11/2008 | Faerber et al. | |
| 2009/0100089 A1 | 4/2009 | Eadon et al. | |
| 2009/0254521 A1 | 10/2009 | Raman et al. | |
| 2010/0030796 A1 | 2/2010 | Netz et al. | |

OTHER PUBLICATIONS

Raman et al. "Constant-Time Query Processing", Data Engineering, 2008. ICDE2008. IEEE 24th International Conference. Apr. 7-12, 2008.

(Continued)

*Primary Examiner* — William Spieler
(74) *Attorney, Agent, or Firm* — IP Authority, LLC; Ramraj Soundararajan (57) ABSTRACT

According to one embodiment of the present invention, a method for the parallel computation of frequency histograms in joined tables is provided. The method includes reading data in a table row-by-row from a database system using a coordinator unit and distributing each read row to separate worker units. Each worker unit computes a partial frequency histogram for each column in the table in parallel. The partial histograms from the worker units are then merged and the coordinator unit sends the merged frequency histograms to the worker units.

21 Claims, 4 Drawing Sheets

1. FOREACH column
2.    IF column value already in histogram THEN
3.       increase frequency count for column value in histogram by 1
4.    ELSE
5.       add column value to histogram with frequency count = 1
6.    END IF
7. END FOREACH column
8. SEND partial histograms to coordinator

OTHER PUBLICATIONS

Larsson, "The Context Trees of Block Sorting Compression," Proceedings of the IEEE Data Compression Conf., Snowbird UT, Mar. 30-Apr. 1, 1998, 10pgs.

Huang et al., "Windowed Huffman Coding Algorithm with Size Adaptation," IEEE Proceedings-I, V140, N2, Apr. 1993, pp. 109-113.

"Effective Inter-Parallel Schemes for Compression/Decompression Speed-up," IBM TDB, V40, N4, Apr. 1997, pp. 157-165.

"Maximum Entropy Method of Data Encoding for Dictionaries and Texts," IBM TDB, V33, N6B, Nov. 1990, pp. 45-46.

* cited by examiner

FIG. 1

| Value | Frequency |
|---|---|
| 1 | 7 |
| 2 | 2 |
| 3 | 1 |
| 4 | 1 |
| 6 | 3 |
| 9 | 1 |

*FIG. 2*

1. FOREACH column
2.    IF column value already in histogram THEN
3.       increase frequency count for column value in histogram by 1
4.    ELSE
5.       add column value to histogram with frequency count = 1
6.    END IF
7. END FOREACH column
8. SEND partial histograms to coordinator

*FIG. 3*

1. FOREACH row
2.   FOREACH column
3.     SET "dependent-frequency" = frequency of primary key value in frequency histogram of foreign key column in fact table
4.     IF column value already in histogram THEN
5.       increase frequency count for column value in histogram by "dependent-frequency"
6.     ELSE
7.       add column value to histogram with frequency count = "dependent-frequency"
8.     END IF
9.   END FOREACH column
A. END FOREACH row
B. SEND partial histograms to coordinator

SYSTEM AND METHOD FOR PARALLEL COMPUTATION OF FREQUENCY HISTOGRAMS ON JOINED TABLES

BACKGROUND

According to a further embodiment of the present invention, a system comprises: a coordinator unit; a plurality of worker units; a set of tables at a first join depth, each table having columns and rows, wherein the coordinator unit reads data in the tables row-by-row and distributes each row to separate worker units; the worker units operating in parallel to compute a partial frequency histogram for each column in the table received from the coordinator unit; and the coordinator unit merging partial histograms from the worker units and sending the merged frequency histograms to the worker units.

Typically, the denormalized data is compressed to reduce storage requirements. One such approach is to use frequency partitioning, combined with dictionary-based encoding, which is described in co-pending U.S. patent application Ser. No. 12/198,079, entitled "Frequency Partitioning: Entropy Compression with Fixed Size Fields", now U.S. Pat. No. 7,827,187, which is incorporated herein by reference. The most frequent values that occurred in a particular column are encoded with short codes only, while less frequent values get a longer code assigned. The codes length determines the partition to which the values belong.

Embodiments of the invention teach a way to exploit multiple computer systems to compute jointly the frequency histograms for the joined, denormalized table—without actually performing the join for all rows.

SUMMARY

According to one embodiment of the present invention, a method comprises: reading data in a table row-by-row from a database system using a coordinator unit; distributing each read row to separate worker units; computing a partial frequency histogram for each column in the table using each worker unit in parallel; merging partial histograms from the worker units; and sending the merged frequency histograms to the worker units using the coordinator unit.

According to another embodiment of the present invention, a method comprises: reading data in a table row-by-row from a database system using a coordinator unit, the table being at a first join depth; distributing each read row to separate worker units; computing a partial frequency histogram for each column in the table using each worker in parallel; merging partial histograms from the worker units; sending the merged frequency histograms to the worker units using the coordinator unit; the coordinator unit reading rows from a table at a second join depth and distributing each second join depth table to one of the worker units; and the worker units computing frequency histograms for each column in the second join depth table using the merged frequency histograms from the first join depth tables.

According to a further embodiment of the present invention, a system comprises: a coordinator unit; a plurality of worker units; a set of tables at a first join depth, each table having columns and rows, wherein the coordinator unit reads data in the tables row-by-row and distributes each row to separate worker units; the worker units operating in parallel to compute a partial frequency histogram for each column in the table received from the coordinator unit; and the coordinator unit merging partial histograms form the worker units and sending the merged frequency histograms to the worker units.

According to another embodiment of the present invention, a computer program product for computing frequency histograms comprises: a computer usable medium having computer usable program code embodied therewith, the computer usable program code comprising: computer usable program code configured to: read data in a table row-by-row from a database system using a coordinator unit; distribute each read row to separate worker units; compute a partial frequency histogram for each column in the table using each worker unit in parallel; merge partial histograms from the worker units; and send the merged frequency histograms to the worker units using the coordinator unit.

DETAILED DESCRIPTION

Figure 1:
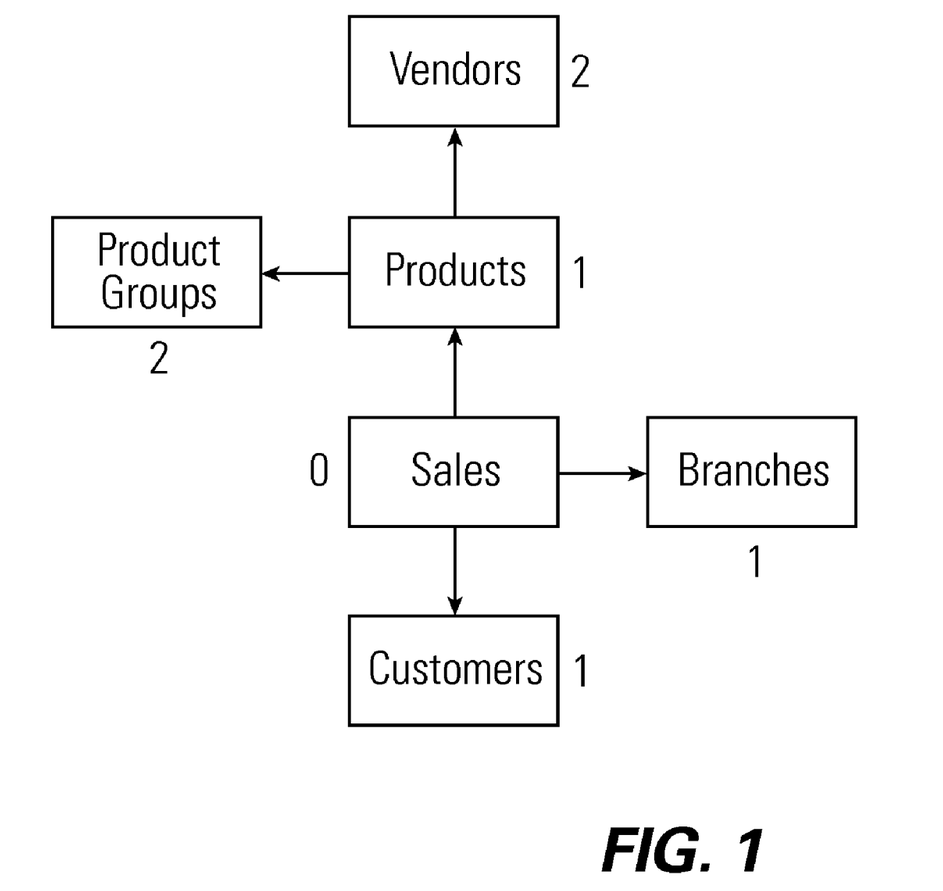
FIG. 1 shows an exemplary diagram of a database snowflake schema in accordance with an embodiment of the invention.

FIG. 1 shows a simple example of a relational data warehouse schema 10 where each box denotes a table and each arrow shows which tables are joined together. A fact table 12 (SALES) refers to three dimension tables 14, 16 and 18. The dimension tables 14, 16 and 18 store information about PRODUCTS, BRANCHES, and CUSTOMERS, respectively. The fact table 12 (SALES) combines information from those dimensions and assigns "measures" to the combination. In this example, the fact table stores "which customer bought which products at which branch", along with the information how many items of the product were bought at which price. The amount and the price are examples of the "measures". Dimension tables may be normalized as well. For example, PRODUCTS can be grouped further into PRODUCT GROUPS, e.g. food or clothing, resulting in a normalized table 20. Information about the VENDORS can be attached to each product, resulting in a normalized table 22. This leads to a so-called snowflake schema, which is a logical arrangement of tables in a relational database such that the entity relationship diagram resembles a snowflake. In general a snowflake schema is represented by centralized fact tables which are connected to multiple dimensions. If the dimension tables directly related to the fact table are not further structured, i.e. the join depth between any arbitrary dimension table and the fact table is always 1 this schema is called a star schema. The present invention may be implemented with star or snowflake schemas but it is not limited to these kinds of schemas and may be used with any relational schema that can be denormalized/joined into a single table. The join-depths are shown in FIG. 1 by the numbers adjacent to the tables. Thus, the fact table 12 has a join depth of 0, the dimension tables 14, 16 and 18 have a join depth of 1, and the normalized tables 20 and 22 have a join depth of 2.

Current disk-based database systems used to implement data warehouse systems (such as DB2) typically exhibit dramatically varying response times—from seconds to hours or even days. There are several approaches that attempt to address those performance questions. They range from pre-computations of queries (also called "materialized" views) or specific indexes.

At least one data warehouse system, called the BLINK prototype—manages data in a denormalized, pre-joined way. See Raman et al., "Constant-Time Query Processing", Data Engineering, 2008, ICDE 2008, IEEE 24$^{th}$ International Conference on Data Engineering, pages 60-69, which is incorporated herein by reference. The advantage of the BLINK approach is that join operations do not have to be performed at run time, leading to improved response times because a simple data access is sufficient. The pre-computed joins are performed based on the relationships between the different tables, which are reflected in the arrows in FIG. 1. For example, a column PRODUCT_ID in the fact table Sales may identify for each row which product it is referring to. Thus, each row in the fact table is combined with the single row in the product dimension table for the product identified by the PRODUCT_ID value. Since multiple rows in the fact table may refer to the same product, the data from the product dimension is effectively copied multiple times and attached to all rows that refer to this product. These multiple occurrences cause a blow-up in space requirements for the melted, denormalized table.

Typically, the denormalized data is compressed to reduce storage requirements. One such approach is to use frequency partitioning, combined with dictionary-based encoding, which is described in co-pending U.S. patent application Ser. No. 12/098,079, entitled "Frequency Partitioning: Entropy Compression with Fixed Size Fields", which is incorporated herein by reference. The most frequent values that occurred in a particular column are encoded with short codes only, while less frequent values get a longer code assigned. The codes length determines the partition to which the values belong.

Figure 2:
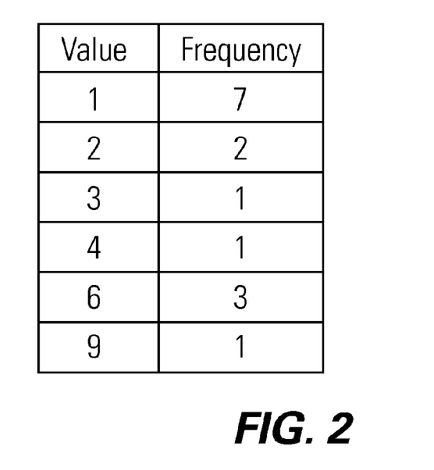
FIG. 2 shows a diagram of an exemplary frequency histogram used with the relational database system in accordance with an embodiment of the invention.

An example of a frequency histogram for a column C in table T where the rows have the values 1, 2, 4, 1, 3, 2, 1, 1, 6, 1, 6, 6, 1, 9, 1 is shown in FIG. 2. Frequencies are highly affected by the tables being joined and the join criteria. As explained above, all the product information is copied to each row that refers to this product via the value in the PRODUCT_ID column. Thus, products that were bought very often occur much more frequently in the joined table than products that were rarely bought (or not at all). For example, the names of such often-bought products are more frequent than names of less often-bought products. Carrying this forward to the compression, frequently bought products are encoded with shorter codes and, therefore, the storage requirements can be reduced overall. Note that it is not generally possible to calculate the frequency histogram on each table independently due to data skew. To come up with a correct histogram, it is important to know which products occur with a higher frequency in the sales transactions. Simply assuming a uniform distribution of products across sales transactions will invariably lead to wrong histograms and, thus, sub-optimal partitioning and code lengths and finally inefficient compression in the denormalized table.

State of the art database systems typically collect frequency distributions (called statistics) in single non-joined tables only. Currently, in the BLINK system, the frequency histograms of column values are calculated on the pre-joined, denormalized table. In other words, all tables are joined first and subsequently the frequency histograms are computed for each column in the joined table. The computation of those joins is an expensive task. Furthermore, the joined data is not yet encoded and compressed because the column frequencies are not yet known at join time. This leads to high storage costs and reduced options to exploit parallelism for the frequency calculation.

Embodiments of the invention teach a ways to exploit multiple computer systems to compute jointly the frequency histograms for the joined, denormalized table—without actually performing the join for all rows.

Exploiting parallelism to compute frequency histograms requires finding ways to split the overall work into multiple packages, which can be completed independently, possibly by different computers. The computers are called workers.

A straight-forward approach is to initially compute the joined table. Following that, each work unit is merely the computation of the frequency histogram of a single column in the joined table. In other words, each worker is responsible for one or more columns only, and combining the results from all workers are the frequency histograms for all columns in the joined table.

This approach has several draw-backs:

All rows from the joined table must be sent to all workers if the data in the joined table is primarily organized by rows. (This is the dominant implementation in today's relational database systems.) Distributing the complete joined table implies a significant communication overhead.

It is not possible to interleave the computation of the frequency histograms with the selection of the data from the database system or the data warehouse. First, all the data must be extracted and joined. Only once this is done, it is possible to start the calculation of the frequency histogram for each column.

There are high storage costs for the joined table, which needs to be materialized. Even if dimension tables are typically small compared to the fact table, the duplication of the dimension table rows during the join with the fact table increases the amount of data to be maintained significantly.

Due to the above issues, the present invention takes a different approach, which involves a distributed and piped histogram calculation. In particular, embodiments of the invention use a dedicated system (called coordinator) to read the data from the database system in the order of the join-depth of the tables, starting with the smallest join-depth, which is the fact table (e.g. SALES).

The coordinator reads the table data row-by-row and distributes each row to a dedicated worker. The particular distribution scheme is not important. In some embodiments the distribution scheme may be round robin (or some other mechanism that evenly distributes rows regardless of the data) or it may be value-based, i.e. looking at the data in each row and deciding based on this data which worker will get the row.

Each worker computes in parallel a partial frequency histogram for each column. This computation can start as soon as the first row is received from the coordinator. It is not necessary for the worker to wait until all rows are available.

Figure 3:
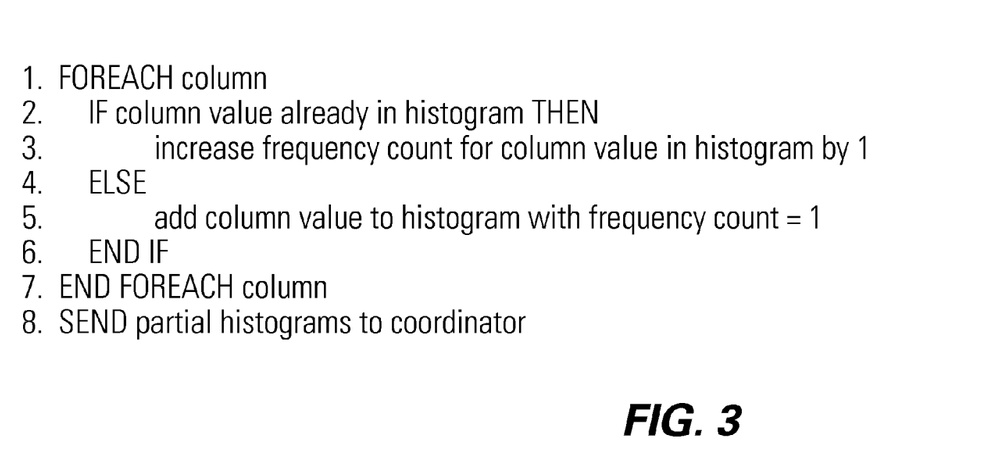
FIG. 3 shows a process for computing frequency histograms in accordance with an embodiment of the invention.

One possible algorithm for the parallel histogram computation by each worker for columns in the fact table (where no join is necessary yet) is shown in FIG. 3. Note that each worker only computes a partial histogram. Also, it is noted that computing the frequency for the merged table cannot be simply done by multiplying the frequencies from the single tables but, instead, the frequencies must be added row-wise.

The coordinator merges all partial histograms received from all workers. This is done by simply summing up the frequencies from the partial histograms. Since each row was sent to a single worker only, it is ensured that the values from each row were only counted once. As a result, the distributed computation of the frequency histogram for the fact table delivers accurate results.

The (merged) frequency histograms for the columns in the fact table are sent to all workers because it is subsequently needed to compute the correct frequency histograms for the columns in the dimension tables at the next join-depth, i.e. the dimension tables directly related to the fact table. In the example shown in FIG. 1, those are the tables BRANCHES, PRODUCTS, and CUSTOMERS—but not the tables VENDOR and PRODUCT GROUP.

The coordinator processes rows from dimension tables in the same way that it processes rows from fact tables and sends each row to a single worker. The decision of where to send each row can again be based on an arbitrary algorithm that results in a more or less equal distribution of the rows in order to provide an even workload among the workers. As before, the worker can immediately start its work when the first row is received. It is not necessary to wait until all rows are available.

When computing the frequency histogram for data in the dimension table it is important to know how often each row in the dimension table is referenced by the rows in the fact table. Each worker computes the frequency histogram for each column in the dimension table using the algorithm shown in FIG. 4. The main difference to the computation of the frequency histograms for the columns in the fact table is that the frequencies are not increased by one but rather by the frequency that the value in the primary key column in the dimension table has in the fact table. The relationship between the fact table and the dimension table is traversed back to the fact table in order to determine this frequency. A so-called foreign key column exists in the fact table, and this column refers to the aforementioned primary key column. The frequency histogram for the foreign key column is consulted to determine the actual increment because this frequency defines how often the current row in the dimension table will occur in the joined, denormalized table. With respect to fact tables, the partial histograms are sent to the coordinator. The coordinator merges the histograms and sends the results to all workers.

The processing of dimension tables with a join-depth larger than one (e.g. VENDORS and PRODUCT GROUPS in FIG. 1) works exactly as was described above with one difference: the dimension table which is directly related to the dimension table currently being processed is now treated as a "fact" table. In the example shown in FIG. 1, that means the frequency histograms of the PRODUCTS dimension table is referred to in the algorithm shown in FIG. 4.

Since all tables are processed with increasing join-depths, it will always be ensured that the frequency histograms for a table at join depth n can always build on the frequency histograms for the tables at join depth n−1.

In some embodiments, the frequency histograms, computed as described above, may be subsequently used as follows. Once the frequency histograms are available for all columns in the joined, denormalized table, the column partitions can be determined based on those histograms. Existing technologies (e.g. greedy algorithms) can be applied for this purpose. With the column partitions being available, the dictionary for each column partition is determined. Those dictionaries are made available to all workers, who can now encode the data from which the frequency histograms were originally generated.

Figure 4:
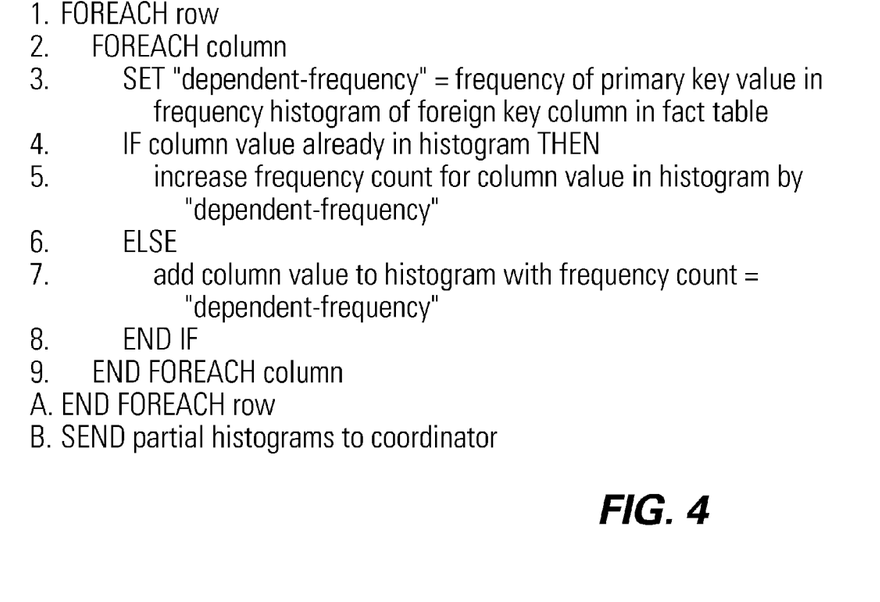
FIG. 4 shows another process for computing frequency histograms in accordance with an embodiment of the invention.

The procedures can be further improved in order to reduce the lookup into the frequency histograms of the foreign key columns shown in the algorithm in FIG. 4. The algorithms shown in FIGS. 3 and 4 are run as usual, but only on a prefix of the fact table, for example only 10% of all rows, or just an absolute number of rows (e.g. 1 million rows). Doing a simple sampling like this allows for an initial compression of all subsequent rows. The frequency histograms on the sample are used to determine an initial column partition and dictionary/encoding. All rows at the worker are encoded with this dictionary. This applies to the rows in the sample as well as all subsequent rows.

The frequency histograms in Algorithms 1 and 2 above can be computed on the encoded and compressed data.

Another application for sampling is if the frequency histograms to be computed for all columns do not have to be exact and a certain error is acceptable. In that case, it is an option to process only a subset of the rows at the coordinator and workers. Using sampling in this fashion does not have any impact on the frequency histogram computation, but does lead to a reduction of the workload on the worker nodes. Thus, it can lead to a performance improvement at the expense of less accurate frequency histograms.

The above description assumed that there was a single column denoting the primary key column in a dimension table and a single column for the foreign key column in the fact table (or intermediate dimension table). Current database systems allow combined keys, i.e. the values in multiple columns combined define a unique identifier for a row in the dimension table. With minor modifications, the disclosed embodiments may be applicable to such combined primary keys as well. In addition to the computation of frequency histograms for each column, a frequency histogram may also be generated for the combination of columns that forms a primary key or foreign key.

The above embodiments assume that a foreign key relationship exists between the tables that are to be joined. Such a foreign key relationship must not necessarily be enforced by the database system, but it is necessary for two reasons:

To uniquely identify the frequency of the foreign key values in the fact table (or intermediate dimension table) to come up with a correct increment in the dimension table.

To derive an implicit join criterion from the foreign key relationships. The join criteria will only be an equi-join, i.e. comparing the values from the foreign key column (fact table) to the values in the primary key column (dimension table) with an equality predicate (F.FK=D.PK).

If other join predicates are required, additional adjustments to the above described embodiments may be needed, as will be appreciated by those skilled in the art.

As can be seen from the above disclosure, embodiments of the invention provide techniques for the parallel computation of frequency histograms in joined tables. As will be appreciated by those skilled in the art, the present invention may be embodied as a system, method or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system."

Furthermore, the present invention may take the form of a computer program product embodied in any tangible medium of expression having computer usable program code embodied in the medium. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, for instance, via optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wire line, optical fiber cable, RF, etc.

Computer program code for carrying out operations of the present invention may be written in any combination of one or more programming languages, including an object oriented programming language such as Java, Smalltalk, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart, and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 5:
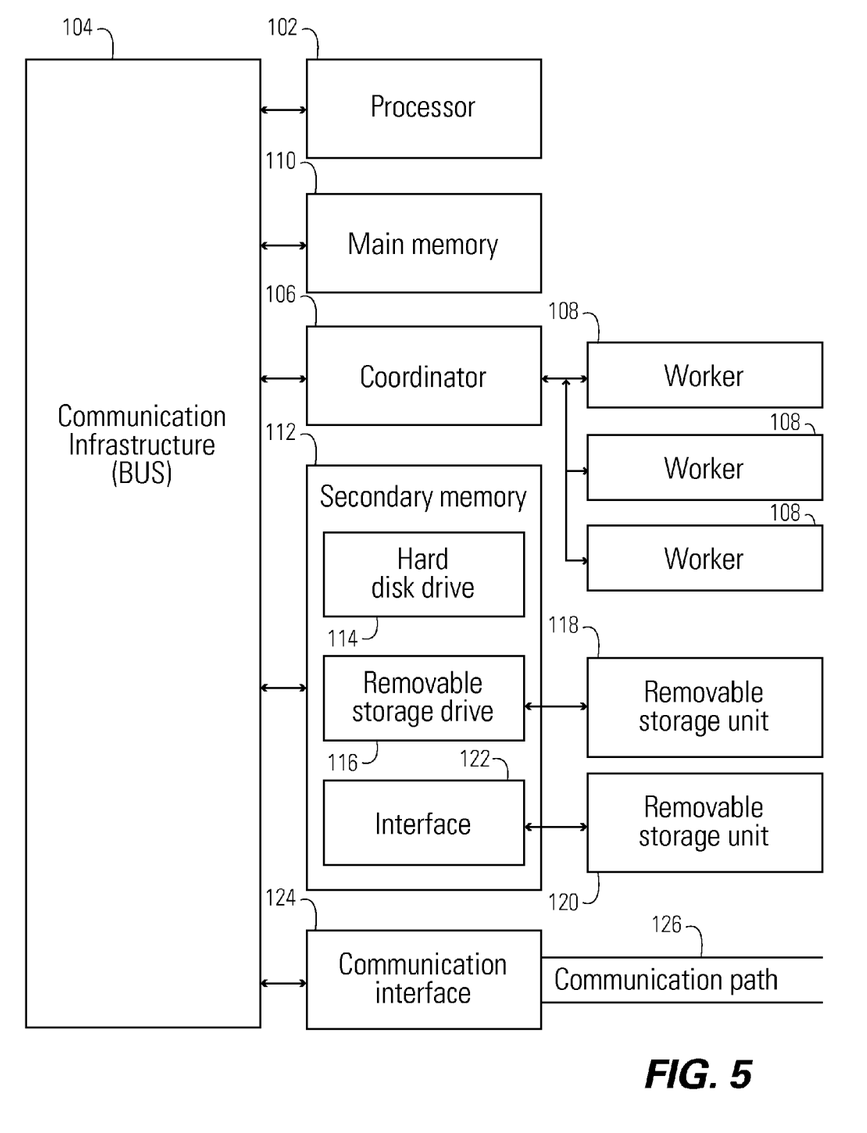
FIG. 5 shows a high level block diagram of an information processing system useful for implementing one embodiment of the present invention.

FIG. 5 is a high level block diagram showing an information processing system useful for implementing one embodiment of the present invention. The computer system includes one or more processors, such as processor 102. The processor 102 is connected to a communication infrastructure 104 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a coordinator 106 that operates as described above. In particular, the coordinator 106 receives tuples to be distributed and processed by a plurality of workers 108, connected through a shared communication bus. The computer system also includes a main memory 110, preferably random access memory (RAM), and may also include a secondary memory 112. The secondary memory 112 may include, for example, a hard disk drive 114 and/or a removable storage drive 116, representing, for example, a floppy disk drive, a magnetic tape drive, or an optical disk drive. The removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc. which is read by and written to by removable storage drive 116. As will be appreciated, the removable storage unit 118 includes a computer readable medium having stored therein computer software and/or data.

In alternative embodiments, the secondary memory 112 may include other similar means for allowing computer programs or other instructions to be loaded into the computer system. Such means may include, for example, a removable storage unit 120 and an interface 122. Examples of such means may include a program cartridge and cartridge interface (such as that found in video game devices), a removable memory chip (such as an EPROM, or PROM) and associated socket, and other removable storage units 120 and interfaces 122 which allow software and data to be transferred from the removable storage unit 120 to the computer system.

The computer system may also include a communications interface 124. Communications interface 124 allows software and data to be transferred between the computer system and external devices. Examples of communications interface 124 may include a modem, a network interface (such as an Ethernet card), a communications port, or a PCMCIA slot and card, etc. Software and data transferred via communications interface 124 are in the form of signals which may be, for example, electronic, electromagnetic, optical, or other signals capable of being received by communications interface 124. These signals are provided to communications interface 124 via a communications path (i.e., channel) 126. This communications path 126 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 110 and secondary memory 112, removable storage drive 116, and a hard disk installed in hard disk drive 114.

Computer programs (also called computer control logic) are stored in main memory 110 and/or secondary memory 112. Computer programs may also be received via communications interface 124. Such computer programs, when executed, enable the computer system to perform the features of the present invention as discussed herein. In particular, the computer programs, when executed, enable the processor 102 to perform the features of the computer system. Accordingly, such computer programs represent controllers of the computer system.

From the above description, it can be seen that the present invention provides a system, computer program product, and method for implementing the embodiments of the invention. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    reading rows from a table at a first join depth by a coordinator unit, said table part of a database system;
    distributing each read row to separate worker units;
    computing a partial frequency histogram for each column in said table at said first join depth using each worker unit in parallel;
    merging partial histograms from said worker units;
    sending said merged frequency histograms to said worker units using said coordinator unit;
    reading rows from said table at a second join depth by said coordinator unit;
    distributing each read row at said second join depth to one of said worker units;
    said worker units computing frequency histograms for each column in said table at said second join depth using said merged frequency histograms from said first join depth tables; and
    outputting said computed frequency histograms at said second join depth.

2. A method according to claim 1, wherein said table at a first join depth is a fact table and said table at a second join depth is a dimension table.

3. A method according to claim 1 wherein said coordinator unit distributes rows evenly to worker units regardless of the data therein.

4. A method according to claim 1 wherein said coordinator unit distributes rows to worker units based on the data in each row.

5. A method according to claim 1 wherein said worker units begin said computing as soon as a first row is received from said coordinator unit.

6. A method according to claim 1 wherein aid worker units perform said computing before a join operation is performed on said table.

7. A method according to claim 1 wherein said computing further comprises, determining if a column value is already in said histogram, and if so, increasing a frequency count by one, and if not, adding said column value to said histogram value with a frequency count equal to one.

8. A method according to claim 1 wherein said merging comprises summing up the frequencies from said partial histograms.

9. A method according to claim 1, wherein said worker units compute frequency histograms for each column in said second join depth by determining if a value in said column is already in said histogram, and if so, then increasing the frequency count for the column value in the histogram by a dependent-frequency value, and if not, adding said column value to said histogram with a frequency count equal to said dependent-frequency value.

10. A method according to claim 9, wherein said dependent-frequency value is the frequency of a primary key value in a frequency histogram of a foreign key column in said first join depth table.

11. A method according to claim 1, wherein said table is at a second join depth, said method further comprising:
    said coordinator unit reading rows from a table at a third join depth and distributing each said third join depth table to one of said worker units; and said worker units computing frequency histograms for each column in said third join depth table using said merged frequency histograms from said second join depth tables.

12. A method comprising:

reading rows in a table at a first join depth by a coordinator unit, said table part of a database system, wherein said table at a first join depth is a fact table;

distributing each read row to separate worker units;

computing a partial frequency histogram for each column in said table at said first join depth using each worker in parallel;

merging partial histograms from said worker units;

sending said merged frequency histograms to said worker units using said coordinator unit;

reading rows from said table at a second join depth by said coordinator unit, wherein said table at a second join depth is a dimension table;

distributing each read row at said second join depth to one of said worker units;

said worker units computing frequency histograms for each column in said table at said second join depth using said merged frequency histograms from said first join depth tables; and outputting said computed frequency histograms at said second join depth.

13. A method according to claim 12 further comprising determining column partitions based on said histograms;

determining a dictionary for each for each column partition;

making said dictionaries available to each worker units;

encoding data from which said frequency histograms were originally generated.

14. A method according to claim 13 wherein said coordinator unit distributes rows evenly to worker units regardless of the data therein.

15. A method according to claim 13 wherein said coordinator unit distributes rows to worker units based on the data in each row.

16. A database system comprising:

a processor; and computer storage storing computer readable program code, said computer readable program code executed by processor to:

read rows from a table at a first join depth by a coordinator unit;

distribute each read row to separate worker units;

compute a partial frequency histogram for each column in said table at said first join depth using each worker unit in parallel;

merge partial histograms from said worker units; and send said merged frequency histograms to said worker units using said coordinator unit;

read rows from said table at a second join depth by said coordinator unit;

distribute each read row at said second join depth to one of said worker units;

compute frequency histograms for each column in said table at said second join depth using said merged frequency histograms from said first join depth tables; and output said computed frequency histograms at said second join depth.

17. A computer program product comprising a non-transitory computer useable medium having computer readable program code embodied therein which, when executed by a computer, implements a method for computing frequency histograms, said medium comprising:

a computer usable medium having computer usable program code embodied therewith, said computer usable program code comprising:

computer usable program code configured to:

read rows in a table at a first join depth using a coordinator unit, said table part of a database system;

distribute each read row to separate worker units;

compute a partial frequency histogram for each column in said table at said first join depth using each worker unit in parallel;

merge partial histograms from said worker units;

send said merged frequency histograms to said worker units using said coordinator unit;

read rows from said table at a second join depth by said coordinator unit;

distribute each read row at said second join depth to one of said worker units;

compute frequency histograms for each column in said table at said second join depth using said merged frequency histograms from said first join depth tables; and output said computed frequency histograms at said second join depth.

18. A computer program product according to claim 17 wherein said coordinator unit distributes rows evenly to worker units regardless of the data therein.

19. A computer program product according to claim 17 wherein said coordinator unit distributes rows to worker units based on the data in each row.

20. A computer program product according to claim 17 wherein said worker units begin said computing as soon as a first row is received from said coordinator unit.

21. A computer program product according to claim 17 wherein said worker units perform said computing before a join operation is performed on said table.

* * * * *